UNITED STATES PATENT OFFICE.

TOKUSEI BAN, OF TOKYO, JAPAN.

PROCESS OF OBTAINING PURE TUNGSTIC ACID.

1,049,193.  Specification of Letters Patent.  Patented Dec. 31, 1912.

No Drawing. Application filed January 24, 1912. Serial No. 673,168.

*To all whom it may concern:*

Be it known that I, TOKUSEI BAN, a subject of the Emperor of Japan, residing at No. 12 Takagi-Cho, Aoyama, Akasaka-Ku, city of Tokyo, Empire of Japan, have invented new and useful Improvements in Processes of Obtaining Pure Tungstic Acid, of which the following is a specification.

This invention relates to processes for obtaining pure tungstic acid, and has for its object to simplify and cheapen such process particularly by avoiding the necessity of using aqua regia, the use of which agent unavoidably renders the operation troublesome, from the generation of an injurious gas, in previously used methods.

To this end the invention consists in first treating the wolframite with strong hydrochloric acid, heating gently, then after removing the greater part of the dissolved iron, and other impurities, treating the resulting tungstic acid with a concentrated solution of bleaching powder, gradually adding thereto a suitable quantity of hydrochloric acid, stirring, and further adding a small quantity of citric acid, together with a sufficient quantity of fresh water, after which the insoluble substances are subjected to a further washing with distilled water. In cases where the ore contains any insoluble matters, such as silica and clay, etc., the ore after being treated in the aforesaid manner, will be dissolved in ammonia and by subsequently filtering, evaporating, and heating, to a red heat pure tungstic acid is produced.

First introduce finely powdered wolframite, $FeWO_4$, into strong hydrochloric acid and heat it gently in usual manner. When the greater part of the iron, as well as other substances contained in the ore are dissolved, the solution is then allowed to cool. Then pour away the clear solution and thoroughly wash the residue with clean water. The residue thus treated will be next placed in the concentrated solution of bleaching powder, and a suitable quantity of hydrochloric acid is added and stirred up slowly. It will be observed that by this agitation the calcium hypochlorite contained in the bleaching powder, acted upon by the hydrochloric acid, will liberate chlorin in a nascent state, which, acting upon iron, and other substances, still existing in the residue, will make them soluble. To the liquor a small quantity of citric acid is then added, together with a sufficient quantity of water, and the solution is let stand for about two hours. Although the ferric chlorid thus diluted will be more or less decomposed so as to produce an insoluble chlorid of bibasic iron, still the citric acid present, will convert it into a soluble citrate of iron. The clear liquor thus produced will be poured out and the residue washed thoroughly with clean water. This will produce pure tungstic acid containing even not a trace of iron. I have found however that in cases where the ore to be operated upon contains any insoluble substances, such as silica, clay, etc.; it is further necessary, after passing through the aforesaid treatment, to dissolve the insoluble residue in ammonia. Then after filtration, the solution will be evaporated to a dry state. Ammonium tungstate thus obtained will be then heated to a red heat thereby causing the ammonia to volatilize and leaving pure tungstic acid.

Heretofore, the aqua regia has been mostly used in such treatment. This produces not only injurious gas during the operation, but has the disadvantage of precipitating insoluble iron salts, which defects are obviated by my present invention.

I claim:

The process of obtaining pure tungstic acid, which consists in first introducing into a strong hydrochloric acid a finely powdered wolframite and heating gently until the greater portion of the soluble substances are dissolved, in cooling the solution and after pouring away the clear solution, washing the residue in the usual manner, subsequently treating with concentrated solution of bleaching powder, gradually adding thereto a suitable quantity of hydrochloric acid with constant stirring, in further adding a small quantity of citric acid together with sufficient water and after pouring away the clear liquor thoroughly washing the residue with fresh water and drying, substantially as set forth.

In testimony whereof I affix my signature in presence of two witnesses.

TOKUSEI BAN.

Witnesses:
 GENJI KURIBARA,
 TOGO OKUBO.